United States Patent [19]

Vassiliou

[11] 4,169,083

[45] Sep. 25, 1979

[54] HEAT-STABLE POLYMER COATING COMPOSITION WITH OXIDATION CATALYST

[75] Inventor: Eustathios Vassiliou, Newark, Del.

[73] Assignee: E. I. Du Pont de Nemours and Company, Wilmington, Del.

[21] Appl. No.: 892,298

[22] Filed: Mar. 31, 1978

Related U.S. Application Data

[60] Division of Ser. No. 780,906, Mar. 24, 1977, Pat. No. 4,122,226, which is a continuation-in-part of Ser. No. 606,297, Aug. 22, 1975, abandoned, which is a continuation-in-part of Ser. No. 509,939, Sep. 27, 1974, abandoned, and a continuation-in-part of Ser. No. 552,871, Feb. 25, 1975, abandoned, which is a continuation-in-part of Ser. No. 509,939.

[51] Int. Cl.² .......................... B05D 3/02; C09D 3/78; C09D 3/82
[52] U.S. Cl. .............................. 260/23 XA; 260/18 S; 260/23 H; 260/37 R; 260/37 N; 260/42.26; 260/42.27
[58] Field of Search .............. 260/18 S, 23 XA, 37 R, 260/37 N, 42.26, 42.27, 23 H, 29.6 R, 900

[56] References Cited

U.S. PATENT DOCUMENTS

| | | | |
|---|---|---|---|
| 2,681,324 | 6/1954 | Hochberg | 260/29.6 F |
| 2,782,180 | 2/1957 | Weidman | 260/42.27 |
| 2,906,730 | 9/1959 | Honn | 260/42.27 |
| 3,293,203 | 12/1966 | Paulus | 260/38 |
| 3,935,141 | 1/1976 | Potts et al. | 260/23 H |
| 4,038,228 | 7/1977 | Taylor | 260/23 XA |
| 4,051,100 | 9/1977 | Bjerk et al. | 260/42.27 |
| 4,054,704 | 10/1977 | Vassiliou | 428/422 |
| 4,054,705 | 10/1977 | Vassiliou | 428/422 |
| 4,064,303 | 12/1977 | Vassiliou | 428/411 |
| 4,066,817 | 1/1978 | DeRossi | 260/42.27 |

*Primary Examiner*—Ronald W. Griffin

[57] ABSTRACT

A coating composition consisting essentially of certain heat-stable polymers, colorants, oxidation catalysts, and liquid carrier useful for coating an article to produce a finish which is capable of having a decorative pattern produced within it is provided.

9 Claims, No Drawings

HEAT-STABLE POLYMER COATING COMPOSITION WITH OXIDATION CATALYST

CROSS-REFERENCE TO RELATED APPLICATION

This is a division of application Ser. No. 780,906, filed Mar. 24, 1977, now U.S. Pat. No. 4,122,226, which in turn is a continuation-in-part of copending application Ser. No. 606,297, filed Aug. 22, 1975, now abandoned, which in turn is a continuation-in-part of application Ser. No. 509,939, filed Sept. 27, 1974, now abandoned, and a continuation-in-part of application Ser. No. 552,871, filed Feb. 25, 1975, now abandoned, which itself is a continuation-in-part of application Ser. No. 509,939.

BACKGROUND OF THE INVENTION

1. Field of Invention

This invention relates to a coating composition consisting essentially of heat-stable polymer, colorant, oxidation catalyst, and liquid carrier.

2. Prior Art

Articles coated with heat-stable polymer compositions of various types have come into widespread use in recent years. Heat-stable polymer coated articles are useful for purposes requiring or aided by a heat-stable surface. Especially useful are heat-stable polymer coating compositions which provide lubricious surfaces. The uses of coated articles having lubricious surfaces range from bearings to ship bottoms and from iron soleplates to ice cube trays.

To achieve maximum consumer demand for an article consumer expectations must be met. One consumer expectation is to have a product which is pleasing to his or her aesthetic sense and which is capable of maintaining this pleasing effect throughout the product's useful life.

The composition of this invention can undergo a process which produces a decorative pattern visible within coatings produced by the composition.

Decorative areas of the coating wear as well as non-decorative areas for the following reasons. The decorative pattern extends through the entire thickness of the coating; therefore, as the coating is worn thinner, the decorative pattern is still present. Concentration of heat-stable polymer is uniform throughout the coating; i.e., the decorative and non-decorative areas; therefore, the coating has uniform heat stability throughout. Thickness of the coating is uniform, i.e., neither the decorative nor non-decorative areas are higher than the other, thereby not facilitating chipping of a higher area.

SUMMARY OF THE INVENTION

According to the present invention, there is provided a coating composition consisting essentially of certain heat-stable polymers, colorants, oxidation catalysts, and liquid carrier.

This coating composition is capable of undergoing a process which renders a decorative pattern visible within a baked coating produced by the composition. The process consists essentially of applying the composition of this invention either as a subsequent coat over or directly under an antioxidant composition which is arranged in a decorative pattern; wherein the antioxidant or its decomposition products diffuse into the coat and hinder the oxidation of the colorant, thereby rendering, upon baking, the decorative pattern visible within the coating produced by the composition.

DETAILED DESCRIPTION OF THE INVENTION

Although any of the compounds described within this application can be utilized within the composition of the invention, when cookware is involved only Food and Drug Administration approved compounds should be used.

A heat-stable polymer is a polymer which is not affected by temperatures above 300° C. which would decompose, oxidize or otherwise adversely affect most organic compounds. Some examples of heat-stable polymers are silicones, polysulfides, polymerized parahydroxy benzoic acid, polysulfones, polyimides, polyamides, polysulfonates, polysulfonamides, H-resins (sold by Hercules Corporation), and fluorocarbons. One or more heat-stable polymers can be present in the composition of this invention.

The preferred heat-stable polymers are fluorocarbons because of their high temperature stability and release properties. The fluorocarbon polymers used are those of hydrocarbon monomers completely substituted with fluorine atoms or a combination of fluorine and chlorine atoms. Included in this group are perfluoroolefin polymers such as polytetrafluoroethylene (PTFE) and copolymers of tetrafluoroethylene and hexafluoropropylene in all monomer unit weight ratios, fluorochlorocarbon polymers such as polymonochlorotrifluoroethylene, and copolymers of tetrafluoroethylene and perfluoroalkyl vinyl ethers. Mixtures of these can also be used.

The heat-stable polymer is ordinarily present in the composition at a concentration of 25% through 95%, preferably 70% through 90%, by weight of the total solids present in the composition.

Although a dry flour or powder of a heat-stable polymer can be used and a carrier provided separately, a polymer in the form of an aqueous surfactant-stabilized dispersion is preferred for its stability and because it is most easily obtained in that form. Dispersions of heat-stable polymers in organic liquids such as alcohols, ketones, aliphatic or aromatic hydrocarbons, or mixtures of these, can also be used. In either case, the liquid generally serves as the carrier for the composition.

A colorant is any compound which changes color when oxidized. Carbon and carbonaceous residues are examples of colorants.

For the purpose of this invention, a reaction such as oxidation of carbon black to carbon dioxide, in which a solid is oxidized to a fugitive gas, the solid thereby vanishing from the composition, is considered a color change.

Carbon can be present in concentrations up to 40% based on the weight of total solids of the composition, preferably in concentrations of 0.5–10%.

Carbonaceous residues are produced by decomposition or partial oxidation of organic compounds which includes organometallic compounds. Organic compounds are normally present in coating compositions to serve as dispersants, coalescing agents, viscosity builders, etc., or they can be added to serve as colorants.

Although absolute amounts of carbonaceous residues in the heat-stable polymer coating are usually extremely small, nevertheless, they give a definite coloration to a baked coating.

Examples of organic compounds which produce carbonaceous residues are polymers of ethylenically unsaturated monomers, which depolymerize, and whose depolymerization products vaporize, in the temperature range of from 150° C. below the fusion temperature to about the heat-stable polymer's decomposition temperature.

"Depolymerization" means degradation of a polymer to the point at which the degradation products are volatile at the temperatures encountered in curing the coat. The degradation products can be monomers, dimers, or oligomers.

"Vaporize" means volatilization of the degradation products and their evaporation from the film.

Usually the polymers of ethylenically unsaturated monomers contain one or more monoethylenically unsaturated acid units.

Representative of these ethylenically unsaturated monomers are alkyl acrylates and methacrylates having 1 to 8 carbon atoms in the alkyl group, styrene, 8-methyl styrene, vinyl toluene and glycidyl esters of 4 to 14 carbon atoms.

Representative of the monoethylenically unsaturated acids are acrylic acid, methacrylic acid, fumaric acid, itaconic acid, and maleic acid (or anhydride).

The polymer of an ethylenically unsaturated monomer which produces a carbonaceous residue can be present as a coalescing agent in the composition at a concentration of about 3% through 60% by weight of total heat-stable polymer and residue producing polymer.

An oxidation catalyst composition is any composition which contains one or more compounds which promotes oxidation under the baking conditions required for fabrication of coated articles. The oxidation catalyst can promote oxidation either itself or through its decomposition products.

Included in this class are compounds of one or more of the metals:

| Chromium | Cerium | Lithium |
|---|---|---|
| Cobalt | Thorium | sodium |
| Iron | Manganese | Potassium |
| Nickel | Bismuth | Lead |
| | Cadmium | or |
| | | Molybdenum | which compounds decompose in the temperature range of about 100°–500° C. to give at least 0.2%, by weight of the metal in the compound, of an oxide or hydroxide.

Enough of such a metal or compound should be present to give at least about 0.005 parts of metal per hundred parts of the heat-stable polymer.

Preferred compounds are oxides or hydroxides of lithium, sodium or potassium, and those compounds produced by reaction of a metal from the following list (1) with an acid to form an salt compound of list (2).

| (1) Metals | | |
|---|---|---|
| | Bismuth | Manganese |
| | Cerium | Lithium |
| | Cobalt | Potassium |
| | Iron | Sodium |
| (2) Salts | | |
| | Acetate | Octoate |
| | Caprate | Oleate |
| | Caprylate | Palmitate |
| | Isodeconoate | Ricinoleate |
| | Linoleate | Soyate |

-continued

| Naphthenate | Stearate |
|---|---|
| Nitrate | Tallate |

More preferred oxidation catalyst compounds are:

| Cobalt octoate | Bismuth octoate |
|---|---|
| Cerium octoate | |
| Manganese octoate | |
| Iron octoate | |

Most preferred as an oxidation catalyst for general purposes of the invention is a combination of cobalt and cerium octoates.

The concentration of the metal compound in the composition will be dictated by the nature of the compound, fabricating baking conditions, amount of colorant, etc. In the general case, the compound is present at a concentration high enough to provide an amount of metal equal to 0.01 through 5 parts per hundred of heat-stable polymer. Preferably the range is 0.1–1% metal.

The composition of this invention can be pigmented or unpigmented. Any pigment or combination of pigments ordinarily used in this sort of composition can be used. Typical of these pigments are titanium dioxide, aluminum oxide, silica, cobalt oxide, iron oxide, etc. The total amount of pigment ordinarily present is at a concentration of up to 40% by weight of the total solids in the composition.

The composition of this invention can contain mica particles, mica particles coated with pigment, and glass and metal flakes. These particles and flakes have an average longest dimension of 10 to 100 microns, preferably 15–50 microns, with no particles or flakes having a longest dimension of more than about 200 microns. Particle and flake size is measured optically against a standard.

The mica particles coated with pigment preferred for use are those described in U.S. Pat. No. 3,087,827, granted to Klenke and Stratton, and U.S. Pat. Nos. 3,087,828 and 3,087,829, granted to Linton. The disclosures of these patents are incorporated into this specification to describe the various coated micas and how they are prepared.

The mica particles described in these patents are coated with oxides or hydrous oxides of titanium, zirconium, aluminum, zinc, antimony, tin, iron, copper, nickel, cobalt, chromium, or vanadium. Titanium dioxide coated mica is preferred because of its availability. Mixtures of coated micas can also be used.

Representative of metal flake which can be used are aluminum flake, stainless steel flake, nickel flake, and bronze flake. Mixtures of flake can also be used.

The mica particles, coated mica particles, or glass and metal flake are ordinarily present in coating compositions at a concentration of about 0.2–20% by weight of total solids.

The composition can also contain such conventional additives as flow control agents, surfactants, plasticizers, coalescing agents, etc., as seem necessary or desirable. These additives are added for reasons, in ways and in amounts known to those skilled in the art.

The amount of total solids in the composition will be governed by the substrate to which the composition is to be applied, method of application, curing procedure, and like factors. Ordinarily, the composition will contain 10% through 80% by weight of total solids, but preferably 30%-50%.

The coating composition of this invention is applied to a thickness of about 0.5-5 mils (dry) and baked for a time and at a temperature sufficient to fuse or cure the heat-stable polymer being used.

The composition of this invention is capable of undergoing a process which renders a decorative pattern visible within a baked coating produced from the composition. The decorative pattern has discrete areas which are darker or lighter or a different color than other areas of the pattern. The pattern can have a predetermined geometry, or it can be a random pattern; however, it does not have a uniform, undifferentiated appearance. By a decorative pattern is meant any discrete image, picture, design, configuration, or illustration which can be formed by any conventional method of applying ink.

The process for producing decorative patterns within a baked coating consists essentially of applying the composition of this invention either as a subsequent coat over or directly under an antioxidant composition which is arranged in a decorative pattern. The antioxidant or its decomposition products diffuse into the composition and hinder oxidation of the colorant, thereby rendering, upon baking, the decorative pattern visible within the coating produced by the composition.

In other words, included in the process are various sequences of applying the compositions to the substrate, for example, (1) first the antioxidant composition, and then the coating composition;

(2) first the coating composition, and then the antioxidant composition;

(3) first a primer composition, then the antioxidant composition, and then the coating composition;

(4) first the antioxidant composition, then a primer composition, and then the coating composition; or (5) first a primer composition, then the coating composition, and then the antioxidant composition.

An antioxidant composition must include an antioxidant compound and a suitable carrier.

An antioxidant is any compound that opposes oxidation under fabrication baking conditions which are required for manufacture of heat-stable polymer coated articles. The antioxidant can oppose oxidation either by itself or through its decomposition or oxidation products. All of these compounds should yield at least 0.01 part by weight, based on solids and expressed as the acid, of the corresponding free acids or anhydrides when the compound is decomposed and/or oxidized during fabrication baking. The preferred yield range is 0.1 to 1 part by weight.

Preferred antioxidants are compounds containing phosphorus, sulfur, boron or any combination of the above. The most common examples include the ortho-, meta-, pyroacids; neutral and basic salts; esters and generally their organic derivatives including organometallic derivatives.

More preferred antioxidants are phosphoric acid, at least completely neutralized with organic base such as triethanolamine or with ammonia, particularly decomposable phosphate salts containing ammonia or amines, 2-ethylhexyldiphenyl phosphate, magnesium glycerophosphate, calcium glycerophosphate, and iron glycerophosphate. Preferably the acid is sufficiently neutralized so that the coating composition has a pH of at least 8 to prevent coagulation of PTFE suspended in the composition.

The antioxidant composition can be applied by any conventional method of applying ink. The preferred methods are to apply the oxidation catalyst composition by "Intaglio" offset, e.g., using a Tampoprint ® machine sold by Dependable Machine co., Inc., or silk screening.

The antioxidant is dissolved or dispersed in suitable carriers for the particular oxidation catalyst.

The antioxidant composition formulation can include color enhancers, viscosity builders or thickeners, wetting agents, pigments, decomposable of heat-stable resins and polymers, neutralizers, liquid carriers, and other adjuncts.

Color enhancers are heat-unstable organic compounds which decompose to produce colorants that enhance the contrast between the pattern and background. Examples are sugar, styrene, starch, fatty acids, and glycerides.

Polytetrafluoroethylene and other heat-stable polymers are examples of viscosity builders or thickeners. Preferably the same heat-stable polymer utilized in the coating composition is utilized as the viscosity builder or thickener.

Examples of pigment are carbon black, iron oxide, cobalt oxide, and titanium dioxide. When pigment is present in the antioxidant composition at least an equal amount, preferably three to ten times as much, of heat-stable polymer will, preferably, also be present.

The baking temperature range of the process is dependent mainly upon which heat-stable polymer composition is utilized. The process of this invention is utilizable upon any conventionally used substrate. The substrate may be coated with a primer prior to the application of the oxidation catalyst composition. The substrate is preferably pre-treated prior to the application of any coating composition. Pre-treatment methods include flame-spraying, frit-coating, grit-blasting, and acid- or alkali-treating. A metal substrate is preferably pretreated by grit-blasing, by flame-spraying of a metal or a metal oxide, or by frit-coating, although the compositions can be applied successfully to phosphated, chromated, or untreated metal. A glass substrate is preferably grit-blasted or frit-coated.

A primer composition, if desired, can be applied either under or over the antioxidant composition. The primer composition can be applied in any of the customary ways, which include spraying, roller coating, dipping, and doctor blading. Spraying is generally the method of choice.

The primer composition can be any conventionally used primer coating. An example is the silica-perfluorocarbon primer disclosed by E. J. Welch in U.S. patent application Ser. No. 405,798, filed Oct. 12, 1973, now abandoned.

The process and composition of this invention are useful for any article that may use a heat-stable polymer surface; examples are cookware, especially fry pans, bearings, valves, wire, metal foil, boilers, pipes, ship bottoms, over liners, iron soleplates, waffle irons, ice cube trays, snow shovels, saws, files and drills, hoppers and other industrial containers and molds.

The following examples are illustrative of the invention. All parts are on a weight basis unless otherwise stated.

EXAMPLE 1

Prepare a coating composition as follows:

(a) Add slowly, with stirring, 31.50 parts by weight of an aqueous dispersion, 40% solids of a methyl methacrylate/ethyl acrylate/methacrylic acid terpolymer having monomer weight ratios of 39/57/4 to 143.6 parts by weight of an aqueous dispersion of 60% by weight polytetrafluoroethylene, containing 6% by weight isooctylphenoxypolyethoxyethanol.

(b) Add slowly, with stirring, to the product of (a), 2.0 parts by weight of a black mill base consisting of:

|  | BY WEIGHT |
|---|---|
| Carbon | 20% |
| Alumininosilicate pigment | 10% |
| Sodium polynaphthanene sulfonate | 3% |
| Water | 67% |

(c) Add slowly, with stirring, to the product of (b), 5.3 parts by weight of a complementary mill base consisting of:

|  | PARTS BY WEIGHT |
|---|---|
| Titanium dioxide | 45 |
| Deionized water | 54.5 |
| Sodium polynaphthanene sulfonate | 0.5 |

(d) Add slowly, with stirring, to the product of (c), 25.7 parts by weight of a solvent-surfactant-oxidation catalyst solution prepared as follows:

Mix together in order:

|  | PARTS BY WEIGHT |
|---|---|
| Triethanolamine | 5.5 |
| Oleic acid | 3.3 |
| Toluene | 11.1 |
| Butyl carbitol | 3.8 |
| Cerium octoate (12% metal content by weight in 2-ethyl-hexanoic acid) | 1.5 |
| Cobalt octoate (12% metal content by weight in mineral spirits) | 0.5 |

Prepare an aluminum panel by frit-coating and priming according to the directions in Example 3 of U.S. patent application Ser. No. 405,798, filed Oct. 12, 1973.

Prepare an antioxidant composition consisting of:

hz,1/32

|  | PARTS BY WEIGHT |
|---|---|
| Phosphoric acid (85%) | 1 |
| Triethanolamine | 5 |

Stamp the antioxidant composition, arranged in a decorative pattern, upon the aluminum panel.

Spray the coating composition produced by (d) onto the aluminum panel to a thickness of 0.7-mil (dry).

Dry the coated panel in air.

Place the air-dried panel into an oven at 430° C. When the temperature of the panel has been 430° C. for 5 minutes, remove the panel.

The area over the antioxidant composition is dark, while the other areas of the coating are light, thereby producing a dark decorative pattern on a light background.

EXAMPLE 2

Prepare an aluminum panel by frit-coating and priming as in Example 1.

Prepare an antioxidant composition consisting of:

|  |  | PARTS BY WEIGHT) |
|---|---|---|
| (a) | 2% Carbopol ® 934 in water (a thickening resin consisting of carboxy vinyl polymers of extremely high molecular weight sold by B.F. Goldrich Chemical Company) | 18 |
| (b) | Phosphoric acid (85%) in water - 1 part by weight Triethanolamine - 5 parts by weight |  |
| (c) | Black mill base made by mixing and pebble-milling: Triethanolamine - 7.00 parts by weight Oleic acid - 3.28 parts by weight Butyl carbitol - 4.23 parts by weight Toluene - 12.56 parts by weight Deionized water - 59.39 parts by weight Channel black - 15.69 parts by weight Aluminosilicate pigment - 7.84 parts by weight | 0.3 |
| (d) | An aqueous dispersion of polytetrafluoroethylene, 60% solids, containing 6% by weight of isooctylphenoxy-polyethoxyethanol | 1.5 |

Prepare a coating composition as in Example 1.

Use a polyester silk screen having 15% open surface and thread diameter of 34 microns to place the antioxidant composition, in a decorative design, onto the aluminum panel.

Spray the coating composition onto the aluminum panel to a thickness of 0.7-mil (dry).

Dry the coated panel in air.

Place the air-dried panel into an oven at 430° C. When the temperature of the panel has been 430° C. for 15 minutes, remove the panel.

The area over the antioxidant composition is dark while the other areas of the coating are light, thereby producing a dark decorative pattern on a light background.

EXAMPLE 3

Prepare an aluminum panel by frit-coating and priming as in Example 1.

Prepare a coating composition as in Example 1.

Prepare an antioxidant composition consisting of:

|  |  | PARTS BY WEIGHT |
|---|---|---|
| (a) | Phosphoric acid (85% in water - 1 part by weight Triethanolamine - 5 parts by weight | 193.0 |

|     |                                    | PARTS BY WEIGHT |
| --- | ---------------------------------- | --------------- |
| (b) | Isooctylphenoxypoly-ethoxyethanol  | 9.65            |
| (c) | Polytetrafluoroethylene powder     | 96.50           |
| (d) | Iron oxide pigment                 | 4.83            |
| (e) | Cobalt oxide pigment               | 4.83            |

Using "Intaglio" offset printing technique, place the antioxidant composition, in a decorative pattern, onto the aluminum panel.

Spray the coating composition onto the aluminum panel to a thickness of 0.7-mil (dry).

Dry the coated panel in air.

Place the air-dried panel into an oven at 430° C. When the temperature of the panel has been 430° C. for 15 minutes, remove the panel.

The area over the antioxidant composition is dark while the other areas of the coating are light, thereby producing a dark decorative pattern on a light background.

EXAMPLE 4

Prepare an aluminum panel by frit-coating as in Example 1.

Prepare a primer composition as follows:

|     |                                                                                                                                                              |           | PARTS BY WEIGHT |
| --- | ------------------------------------------------------------------------------------------------------------------------------------------------------------ | --------- | --------------- |
| (a) | The polyamide acid amine salt solution of Example 1 of Application S.N. 546,998, filed February 4, 1975 (containing 18% of furfuryl alcohol and 10% of N-methyl-pyrolidone) |           | 151.8           |
| (b) | Furfuryl alcohol                                                                                                                                             |           | 15.2            |
| (c) | Deionized water                                                                                                                                              |           | 520.0           |
| (d) | White pigment dispersion (made by ball-milling a mixture of                                                                                                  |           |                 |
|     | TiO$_2$                                                                                                                                                      | 46 Parts  |                 |
|     | Water                                                                                                                                                        | 46 Parts  |                 |
|     | Triethanolamine oleic acid mixture 2/1                                                                                                                       | 8 Parts)  | 52.6            |
| (e) | PTFE dispersion in water (60% solids)                                                                                                                        |           | 222.5           |
| (f) | "Ludox AM" (a colloidal silica sold by E. I. du Pont de Nemours and Company)                                                                                 |           | 29.8            |

Spray the primer composition on the frit-coated aluminum panel to a thickness of 0.3-mil (dry) and then dry in air.

Prepare an antioxidant composition as in Example 3.

Using "Intaglio" offset printing technique, place the antioxidant composition, in a decorative pattern, onto the aluminum panel.

Prepare a coating composition as follows:

|     |                                                                                                                                        |              | PARTS BY WEIGHT |
| --- | -------------------------------------------------------------------------------------------------------------------------------------- | ------------ | --------------- |
| (a) | Mix together slowly, with stirring, PTFE dispersion in water - 60% solids by weight containing 6% by weight isooctylphenoxypolyethoxyethanol |              | 324.25          |
|     | Black mill base consisting of                                                                                                          |              |                 |
|     | Carbon                                                                                                                                 | 20% by wt.   |                 |
|     | Aluminosilicate pigment                                                                                                                | 10% by wt.   |                 |
|     | Sodium polynaphthanenesulfonate                                                                                                        | 3% by wt.    |                 |
|     | Water                                                                                                                                  | 67% by wt.   | 4.5             |
| (b) | Slowly with vigorous stirring add to the product of (a) TiO$_2$ coated mica ("Afflair" NF-140-D, sold by E. I. du Pont de Nemours and Company) |              | 4.00            |
| (c) | Premix the following and then add slowly with stirring to the product of (b)                                                           |              |                 |
|     | Triethanolamine                                                                                                                        | 11.35 parts  |                 |
|     | Oleic acid                                                                                                                             | 7.15 parts   |                 |
|     | Toluene                                                                                                                                | 25.35 parts  |                 |
|     | Butyl carbitol                                                                                                                         | 8.5 parts    |                 |
|     | Cerium octoate (23% metal content)                                                                                                     | 1.80 parts   |                 |
|     | Cobalt octoate (18% metal content)                                                                                                     | 0.75 parts   | 54.90           |
| (d) | Add slowly, with stirring, an aqueous dispersion, 40% solids of a methyl methacrylate/ethyl acrylate/methacrylic acid terpolymer having monomer weight ratios of 39/57/4 |              | 71.1            |
| (e) | Add slowly, with stirring, to the product of (d) Deionized water                                                                       |              | 24.25           |

Spray the coating composition onto the aluminum panel to a thickness of 0.7-mil (dry).

Dry the coated panel in air.

Place the air-dried panel into an oven at 430° C. for 15 minutes, then remove the panel.

The area over the antioxidant composition is dark while the other areas of the coating are light, thereby producing a dark decorative pattern on a light background.

What is claimed is:

1. A composition consisting essentially of
   (a) 25-95%, based on the weight of total solids, of a heat-stable polymer, said heat-stable polymer being stable at temperatures above 300° C., which is silicone, polysulfide, polymerized parahydroxy benzoic acid, polysulfone, polyimide, polyamide, polysulfonate, polysulfonamide, or fluorocarbon polymers, or a mixture thereof;
   (b) colorant, which is carbon, carbonaceous residue, or a mixture thereof;
   (c) at least enough of an oxidation catalyst to promote oxidation under fabrication baking temperatures, said oxidation catalyst being a combination of compounds of both cerium and cobalt which decompose to oxides or hydroxides at temperatures in the range of 100°-500° C.; and
   (d) liquid carrier.

2. The composition of claim 1 wherein (b) includes 0.01-40%, based on the weight of the total solids, of carbon black.

3. The composition of claim 1 wherein the heat-stable polymer is fluorocarbon.

4. The composition of claim 3 wherein the fluorocarbon is a polymer of a hydrocarbon monomer completely substituted with fluorine atoms or a combination of fluorine atoms and chlorine atoms.

5. The composition of claim 3 wherein the fluorocarbon is a perfluoroolefin.

6. The composition of claim 5 wherein the perfluoroolefin is polytetrafluoroethylene, a copolymer of tetrafluoroethylene and hexafluoropropylene, or mixtures of the above.

7. The composition of claim 1 wherein the oxidation catalyst is a compound or mixture of compounds produced by reaction of cobalt and cerium, together or separately, with an acid to form a salt compound of:

| | |
|---|---|
| Acetate | Octoate |
| Caprate | Oleate |
| Caprylate | Palmitate |
| Isodecanoate | Ricinoleate |
| Linoleate | Soyate |
| Naphthenate | Stearate |
| Nitrate | Tallate |

8. The composition of claim 7 wherein the oxidation catalyst is a combination of cerium octoate and cobalt octoate.

9. The composition of claim 1 further consisting of pigment, flow control agent, surfactant, plasticizer, coalescing agent, or mixtures of the above.

* * * * *